(12) United States Patent
Nishizawa et al.

(10) Patent No.: US 6,302,669 B1
(45) Date of Patent: Oct. 16, 2001

(54) APPARATUS FOR PRODUCING A SOLID MAGNET ROLLER USING A MOVABLE MOLD

(75) Inventors: Toshimichi Nishizawa; Takatoshi Nanba; Kazuhiro Nakada, all of Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/179,482

(22) Filed: Oct. 27, 1998

Related U.S. Application Data

(63) Continuation-in-part of application No. 08/654,703, filed on May 29, 1996, now abandoned.

(30) Foreign Application Priority Data

May 31, 1995 (JP) .................................................... 7-133771
Apr. 25, 1996 (JP) .................................................... 8-105658

(51) Int. Cl.[7] .................................................. B29C 45/04
(52) U.S. Cl. ..................... 425/3; 425/DIG. 33; 425/410; 264/328.7
(58) Field of Search ............................. 264/328.7; 425/3, 425/DIG. 33, 410, 555

(56) References Cited

U.S. PATENT DOCUMENTS

| | | | |
|---|---|---|---|
| 3,438,086 | * | 4/1969 | Valyi ........................................ 425/3 |
| 3,555,621 | * | 1/1971 | Hara ................................ 425/DIG. 3 |
| 4,327,346 | * | 4/1982 | Tada et al. ......................... 264/328.1 |
| 4,604,042 | * | 8/1986 | Tanigawa et al. ............... 425/DIG. 3 |
| 4,678,616 | * | 7/1987 | Kawashima .................. 425/DIG. 33 |
| 5,082,604 | * | 1/1992 | Valyi ..................................... 425/555 |
| 5,145,614 | * | 9/1992 | Kuroda ................................... 264/24 |
| 5,505,896 | * | 4/1996 | Sih ..................................... 264/328.7 |
| 5,547,621 | * | 8/1996 | Naritomi ........................... 264/328.7 |

FOREIGN PATENT DOCUMENTS

| | | |
|---|---|---|
| 19622093.9 | 12/1996 | (DE) . |
| 08105658 | 2/1997 | (JP) . |
| 08135137 | 2/1997 | (JP) . |

* cited by examiner

*Primary Examiner*—Nam Nguyen
*Assistant Examiner*—Thu Khanh T. Nguyen
(74) *Attorney, Agent, or Firm*—Baker Botts L.L.P.

(57) ABSTRACT

An apparatus for manufacturing a magnet roller makes it possible to remarkably reduce defects on the surface or the inside of a magnet roller and also to control "warp" of the magnet roller sufficiently so that it does not adversely affect the functions of the magnet roller. A metal mold for magnetic field injection molding is composed of two fixed mold counterparts and a movable mold counterpart. The movable mold counterpart is moved to increase the volume of the cavity of the metal mold as a resin-bonded magnet material is injected into the mold.

8 Claims, 13 Drawing Sheets

APPARATUS FOR PRODUCING A SOLID MAGNET ROLLER USING A MOVABLE MOLD

This is a continuation-in-part of application Ser. No. 08/654,703 filed May 29, 1996, now abandoned.

BACKGROUND OF THE INVENTION

1. Field of the Invention

The present invention relates to an apparatus and a method for producing a magnet roller which is incorporated in a developing roller, a cleaning roller, a toner carrying roller, or the like used for an electrophotographic copier, a laser beam printer, a facsimile, or the like.

2. Description of the Related Art

An electrophotographic apparatus or an electrostatic recording apparatus such as a copier and a laser beam printer is designed to make a magnetic developing agent, namely, toner, which is carried by a developing roller, adhere to an electrostatic latent image formed on an image bearing member such as a photosensitive drum, thereby developing the image. The developing roller has a magnet roller which is formed using a resin-bonded magnet and which is disposed in a rotating nonmagnetic sleeve; it carries the magnetic toner to a vicinity of the surface of the photosensitive drum in such a manner that the magnetic toner is shaped like a spike or like a thin layer on the surface of the sleeve, then it develops an image by making the toner adhere to the electrostatic latent image by bringing the toner in contact with the photosensitive drum or by jumping development.

Hitherto, the aforesaid magnet roller is produced by shaping a pelletized resin magnet composition, which is composed of a thermoplastic resin binder such as nylon and polypropylene with magnetic powder such as ferrite mixed therein, by injection molding or extrusion molding using a metal mold with a magnetic field generator disposed around the metal mold, thereby magnetizing the roller to a desired magnetic characteristic. In this case, the roller is usually provided with shafts on both ends thereof; a single shaft may be fed through the roller in the axial direction to provide the shafts on both ends, separate shafts may be provided on both ends, or the shafts on both ends or a shaft on one end is molded integrally with a roller body by using a composition for resin-bonded magnet.

The manufacturing method for the magnet roller whereby the metal mold with the magnetic field generator disposed therearound for injection molding is called a magnetic field injection molding method. According to the magnetic field injection molding method, a melted resin-bonded magnet material composed primarily of resin powder and a binder is injected into the cavity of a two-piece metal mold, then a magnetic field is applied from outside around the cavity of the metal mold to magnetize it, thereby producing a resin magnet. Then, the metal mold is cooled to harden the magnet roller made of the resin magnet and the mold is split to take out the completed magnet roller.

Referring to FIG. 14, the manufacturing method for a magnet roller which is based on the conventional magnetic field injection molding method will be described. FIG. 14 is a cross-sectional view of a resin-bonded material which has been injected in a magnetic field injection molding metal mold 100 constituted by cover mold counterparts 101 and 102, dell pressure being applied thereto. A cavity 104 for the magnet roller is formed by the cover mold counterparts 101 and 102, approximately half thereof being in the respective cover mold counterparts. The mold temperature is maintained at a fixed level by a cooling pipe, not shown. One of the cover mold counterpart 101 or 102 is mounted, as a fixed mold, on the resin-bonded magnet material injection molding apparatus, not shown, and the other is mounted as a movable mold. A magnetic field generator 106 is provided in the vicinity of the metal mold 100. The injection molding apparatus is equipped with a nozzle 105.

As shown in FIG. 14, to mold the magnet roller by the magnetic field injection molding method, the metal mold 100 is formed by clamping the fixed mold counterpart and the movable mold counterpart with a parting line 107 as the boundary, a melted resin-bonded magnet material 10 is injected through an injection hole 102A while applying a magnetic field to the cavity 104 of the metal mold 100 by the magnetic field generator 106, thereby magnetizing the resin-bonded magnet material 10 to mold the resin magnet. After cooling time elapses, the metal mold 100 is released and the magnet roller made of the resin magnet is taken out.

The magnet rollers manufactured according to the conventional magnetic field injection molding method, however, have such defects as flow marks on the surfaces thereof or bubbles at the central portions thereof from time to time.

FIG. 15 is a typical explanatory diagram showing the flow marks and bubbles that take place in injection moldings. These defects are likely to occur when a melted resin with high viscosity is used for injection molding. When the viscosity of the melted resin is high, melted resin 111 is shaped like a string in the early stage of filling when it is injected from the gate into a metal mold 110 as illustrated in FIG. 15(A). As is schematically shown in FIG. 15(B), the melted resin, which has been injected in the string-like shape, ends up being charged in the cavity in a compressed state. Melted resin 112, which has been shaped like entangled strings, is compressed and fused, leading to the formation of a fused mark 113 which is known as the flow mark. Further, as schematically illustrated in FIG. 15(A), when the string-like melted resin is injected into the metal mold, air in the cavity is sometimes caught in a spot 115 between the entangled melted resin strings. The result is a bubble 116 in the finished molding as shown by the cross section of FIG. 15(C). This is the defect known as the bubble inside.

Even if magnet rollers are free of such defects, they tend to have warp in the lengthwise direction more or less, whereas they should be straight in the axial direction. If a magnet roller is warped, then the gap between the surface of the roller and the sleeve, which is formed when a nonmagnetic sleeve is attached, varies according to the lengthwise position of the roller. As a result, the developing roller in which the warped magnet roller has been incorporated will have a magnetic force characteristic which varies in the axial direction of the roller, causing unstable toner carrying function. The magnetic pole of the warped magnet roller is frequently twisted in the lengthwise direction.

Thus, the magnet rollers manufactured according to the conventional method have many defects and incur warp more or less, leading to the need for inspection on every magnet roller for warp in the production process. This calls for inspection equipment and inspection man-hours; those magnet rollers, the warp of which exceeds a tolerance, are eliminated as defective products.

SUMMARY OF THE INVENTION

The present invention has been accomplished with a view toward solving the problem with the prior art stated above, and it is an object of the present invention to provide an apparatus and a method for producing a magnet roller which make it possible to remarkably decrease the defects on the surfaces and/or inside of magnet rollers and to securely obtain magnet rollers in which the warp thereof has been controlled to such an extent that it does not lead to functional problems.

The inventors have repeatedly carried out various experiments to identify the cause of the bubbles in the core of a magnet roller which has been manufactured using the conventional magnetic field injection molding method, or of such defects as a flow mark on the surface thereof, or the warp thereof. The inventors have found that these problems occur because the melted resin-bonded magnet material injected into the mold is free to flow in the cavity of the metal mold and it starts to settle and accumulate first in an area where the magnetic force is the strongest.

More specifically, when the melted resin-bonded magnet material is injected under high pressure into the cavity of the metal mold to which the magnetic field is being applied, the melted resin-bonded magnet material, which has been poured through the injection hole, starts to move around in the cavity of the mold; however, the magnetic field causes the melted resin-bonded magnet material to begin adhering and accumulating first onto the cavity wall surface which has stronger magnetic force. At this point, because the intensity of the magnetic field in the cavity changes in the circumferential direction, the adherence and accumulation of the resin-bonded magnet material onto the cavity wall surface also changes in the circumferential direction.

Continuing the injection of the melted resin-bonded magnet material causes the melted resin-bonded magnet material to partially accumulate and also causes a part thereof on the cavity wall surface to solidify due to the cooling effect of the mold. This causes the resin-bonded magnet material to be deposited and formed, beginning from the outer circumferential surface and then toward the axis of the magnet roller. This means that the resin-bonded magnet material is not charged uniformly in weight into the magnet roller cavity and the molecular orientation of the binder is nonuniform. As a result, such defects as bubbles occur at the central area of the magnet roller or such defects as the flow marks are produced on the outer surface.

The charging process of the resin-bonded magnet material stated above is also responsible for uneven circumferential heat history of the resin-bonded magnet material on the outer surface of the magnetic roller, which in turn leads to the uneven circumferential shrinkage of the outer surface of the magnet roller. The uneven shrinkage is partly responsible for the lengthwise warp of the magnet roller.

The problem with the conventional magnetic field injection molding method is attributable to the fact that the melted resin-bonded magnet material which has been injected into the cavity of the mold is allowed to move freely under the influences of the magnetic forces. It is therefore considered to be possible to control the chance of the occurrence of the defects at the central part as well as on the surface of the magnet roller and also of the warp by filling the cavity of the metal mold with the resin-bonded magnet material uniformly and densely.

Furthermore, the inventors have studied magnet rollers with different structures in relation to the above-described problems caused by the conventional techniques. As a result, they found that in the case where a resin-bonded magnet material is injected in a metal mold inserted with a shaft therethrough, the injected material is more apt to form a bulk since the material is charged while making contact with the shaft (this phenomenon is notable when the shaft has a diameter of A and a magnet body of the magnet roller has a diameter of 4 A or less), and such defect as warp is less likely to occur due to the presence of the shaft. On the other hand, the inventors recognized that in the case where a resin-bonded magnet material is injected in a metal mold without inserting the shaft therethrough such that a solid magnet body is molded, the above-described problems took place mainly because the resin-bonded magnet material was charged into the metal mold as illustrated in FIG. 15(A) through FIG. 15(C).

The magnet roller with the shaft, however, is associated with such problems as an increase in the cost for the use of the shaft, and an increase in the number of steps for pre-inserting the shaft through the metal mold in manufacturing the magnet roller.

The present invention has been accomplished by such awareness of the problem with the conventional manufacturing method for the magnet rollers, especially magnet rollers with solid bodies, and also by the efforts made for identifying the cause; and the objects thereof are achieved by making the volume of the mold cavity variable and restricting the free movement of the resin-bonded magnet material in the cavity, thereby enabling uniform and dense charging of the resin-bonded magnet material into the cavity.

Specifically, an apparatus for producing a magnet roller according to the present invention includes: a fixed mold having a cavity for forming a solid magnet body; a movable mold disposed in the cavity, which is capable of increasing or decreasing a volume of the cavity in accordance with an injected amount of the melted resin-bonded magnet material composed primarily of magnetic powder and a binder; and a magnetic field generator disposed around the fixed mold.

After starting the injection of the resin-bonded magnet material, a movable mold is moved in the direction for increasing the volume of the cavity as the injection of the resin-bonded magnet material is continued.

Starting the injection of the resin-bonded magnet material when the volume of the mold cavity is the smallest prevents the first flow of the resin-bonded magnet material from dispersing in the cavity and allows the resin-bonded magnet material to be charged so that the cross section of the cavity is fully charged from the injection hole side.

The movable mold is moved away from the injection hole of the metal mold while the resin-bonded magnet material is being charged. The movable mold is moved by the flowing pressure of the injected resin-bonded magnet material. At this point, providing a biasing force to the movable mold in the direction for decreasing the volume of the cavity by biasing means which in turn is provided with the biasing force by an air cylinder, a coil spring or the like, prevents the volume from exceeding the injection amount of the resin-bonded magnet material. Furthermore, when the movable mold moves along the mold wall surface under the flowing pressure of the resin-bonded magnet material, supporting the movable mold by the biasing means as the magnetic resin material is injected makes it possible to maintain a proper balance between the injection amount of the resin-bonded magnet material and the increase in the volume of the cavity. The biasing means extends in the cavity to thereby provide a biasing force to the movable mold. The movable mold moves in the lengthwise direction of the cavity against the biasing force provided by the biasing means extending in the cavity, preferably with a back pressure of 0.5 to 50 kg/cm$^2$.

A method for producing a magnet roller according to the present invention is a method in which a resin-bonded magnet material, which is composed primarily of magnetic powder and a binder, is injected into a cavity of a metal mold while applying a magnetic field thereto. A fixed mold having a cavity for forming a solid magnet body and a movable mold disposed in the cavity and capable of increasing or decreasing a volume of the cavity are used as the metal mold. While injecting a melted resin-bonded magnet material into the cavity, the movable mold is moved such that the volume of the cavity is increased in accordance with the injected amount of the melted resin-bonded magnet material, and a magnet body molded within the cavity is magnetized by a magnetic field generator disposed around the fixed mold.

The movable mold moves in a lengthwise direction of the cavity preferably with a back pressure of 0.5 to 50 kg/cm$^2$ against a biasing force provided by biasing means extending in the cavity.

According to the present invention, the volume of the mold cavity increases only by the volume corresponding to the increase in the amount of the injected resin-bonded magnet material; therefore, the resin-bonded magnet material can be uniformly and densely injected all the way to the center of the mold cavity. This prevents the core of the completed magnet roller from incurring the bubbles or other defects and also prevents the surface thereof from incurring the flow marks or other defects.

Further, the heat history of the resin-bonded magnet material on the outer surface of the magnet roller becomes uniform in the circumferential direction, resulting in uniform shrinkage in the circumferential direction. This minimizes the chance the magnet roller will warp in the lengthwise direction.

The surface roughness of the magnet roller produced according to the present invention is 20 $\mu$m or less based on a Japanese Industry Standard (JIS) 10-point average roughness scale Rz (JIS B0601-1982). When the magnetic force of the magnet roller is measured at intervals of 1 mm in the direction parallel to the axis thereof, the difference in magnetic force between the adjacent points is 10 gauss or less. The magnet roller which has such a small surface roughness value and exhibits the uniform magnetic property along the axis thereof cannot be produced by the conventional manufacturing method; it was not until the present invention was accomplished that the magnet roller having the desirable characteristics stated above became available.

The term surface roughness Rz used herein is a ten-point mean surface roughness by JIS B0601-1982. The terms, surface roughness, profile, reference length of profile, roughness curve, cut-off value, mean line of profile, and profile peak and valley are as defined in the standard. In FIG. 16, the ten-point mean roughness shall be the difference, expressed in micrometer ($\mu$m), between the mean value of altitudes of peaks from the highest to the 5th, measured in the direction of vertical magnification from a straight line a that is parallel to the mean line and that does not intersect the profile, and the mean value of altitudes of valleys from the deepest to the 5th, within a sampled portion, of which length corresponds to the reference length, from the profile. The profile may be depicted by means of a probe meter, for example. The ten-point mean roughness Rz is given by the following equation:

$$Rz=[(R1+R3+R5+R7+R9)-(R2+R4+R6+R8+R10)]/5$$

wherein R1, R3, R5 R7 and R9 are altitudes of peaks from the highest to the 5th for the sampled portion corresponding to the reference length L, and R2, R4, R6, R8, and R10 are altitudes of valleys from the deepest to the 5th for the sampled portion corresponding to the reference length L. The reference length L varies with the range of the ten-point mean roughness Rz and it is also in conformity to the standard. For example, L=0.25 mm when Rz<0.8 $\mu$m, L=0.8 mm when 0.8 $\mu$m<Rz<6.3 $\mu$m, L=2.5 mm when 6.3 $\mu$m<Rz<25 $\mu$m, and so on.

The magnet roller is capable of generating uniform magnetic force in the axial direction without the need for modifying the external dimensions of the magnet roller by grinding, cutting, or other type of machining. Hence, using the magnet roller as the developing roller for a developing apparatus enables the formation of good images.

The magnet roller produced according to the present invention is ideally used as the magnet roller constituting the developing roller, the cleaning roller, or the toner supplying roller of a copier, a printer, or other electrophotographic apparatus or an electrostatic recording apparatus.

For example, the magnet roller produced according to the present invention is best suited for the developing roller or the developing agent supplying roller in a developing apparatus which develops an electrostatic latent image, which has been formed on an image bearing member, by using a developing agent so as to visualize the image. The developing agent supplying roller is disposed together with the developing roller in the developing apparatus; it supplies toner to the developing roller.

The magnet roller produced according to the present invention is suitably used as a magnet roller for use in a cleaning apparatus for removing a developing agent which remains on an image carrier after an electrostatic latent image formed on the image carrier is transferred to a transfer material as a visible image by the developing agent. In the cleaning apparatus, a cleaning roller incorporating a magnetic roller is used to collect toner by magnetic force after the toner remaining on the image carrier such as a photosensitive drum is scraped off with a cleaning blade. In this case, the magnetic roller is arranged at a position suitable for the collection of the toner, the toner is adsorbed to the magnetic roller by magnetic force, and the toner is scraped off from the magnetic roller by the blade at a predetermined position so that the toner is collected by a predetermined toner collection unit. The cleaning roller is also used as a roller for removing toner remaining on an image carrier by applying magnetic force to the toner or for facilitating the removal of toner with a cleaning blade.

DESCRIPTION OF THE PREFERRED EMBODIMENTS

The preferred embodiments of the present invention are described hereinafter with reference to the accompanying drawings.

Figure 11:
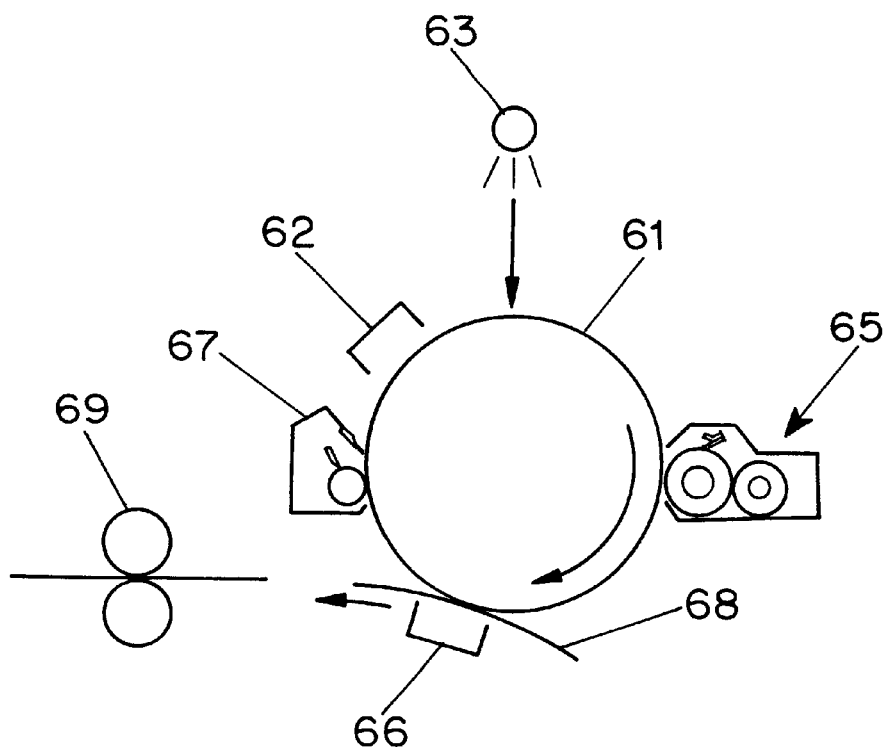
FIG. 11 is a schematic diagram of a copier.

FIG. 11 is a schematic diagram for explaining an exemplary copier of an electrophotographic system comprising the developing apparatus incorporating a magnet roller manufactured according to the present invention and a cleaning apparatus. This copier comprises a cylindrical photosensitive drum 61 which rotates in a direction shown by an arrow, and a primary charging apparatus 62, a light source 63 for image exposure, a developing apparatus 65, a transfer apparatus 66 and a cleaning apparatus 67, all arranged around the photosensitive drum 61. The photosensitive drum 61 is charged with several hundreds of volts by the charging apparatus 62 and an image of an original illuminated by the light source 63 is formed at an image exposure section. A surface charge selectively disappears owing to this image exposure and an electrostatic latent image is formed on the photosensitive drum 61. The developing apparatus 65 makes toner adhere to the electrostatic latent image formed on the photosensitive drum 61 to visualize it. The visible image formed by the toner is transferred to transfer paper 68 by the transfer apparatus 66 which charges the transfer paper 68 with electricity from the rear surface thereof. A toner image thus transferred to the transfer paper 68 is fixed to the transfer paper 68 by a fixing apparatus 69. The toner remaining on the photosensitive drum after image transfer by the transfer apparatus 66 is removed by the cleaning apparatus 67 and the photosensitive drum having a clean surface is charged with a predetermined voltage by the primary charging apparatus 62 again. Thus exposure and development are repeated.

Figure 12:
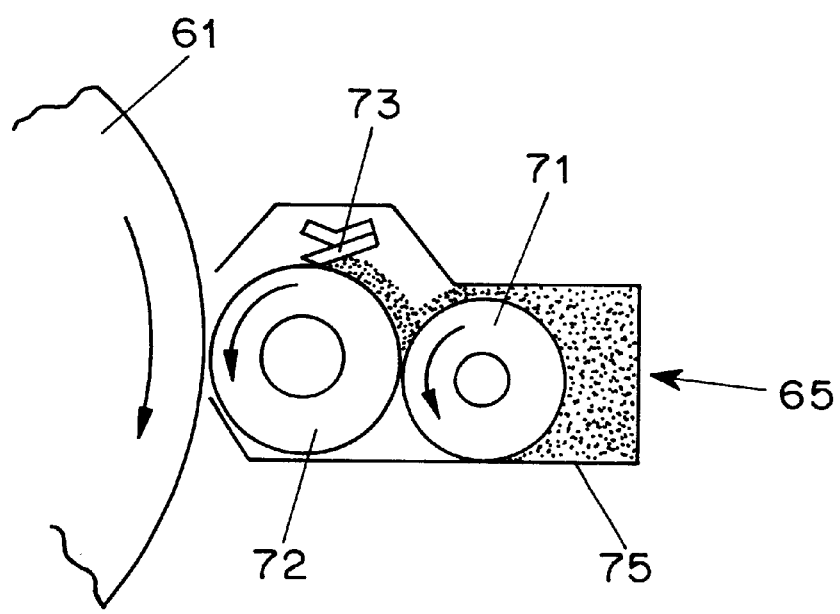
FIG. 12 is a schematic explanatory diagram of a developing apparatus.

FIG. 12 is a schematic diagram illustrative of an example of a developing apparatus 65. Disposed in housing 75 of the developing apparatus 65 are a toner carrying roller 71 for carrying magnetic toner from a toner chamber, a developing roller 72 for carrying the toner, which has been carried out by the toner carrying roller 71, to the surface of a photosensitive drum 61 to attach it to an electrostatic latent image, and a doctor blade 73 for keeping the thickness of a magnetic toner layer on the developing roller 72 constant. The toner carrying roller 71 is a sleeveless magnet roller; and the developing roller 72 is a magnet roller provided with a nonmagnetic sleeve therearound. The developing roller 72, the photosensitive drum 61, and the toner carrying roller 71 respectively rotate in the directions shown by the arrows in the drawing to supply the magnetic toner from the toner carrying roller 71 to the surface of the developing roller 72. The toner is formed into a thin layer of uniform thickness by the doctor blade 73 and the thin layer of the toner is carried onto the surface of the photosensitive drum 61 whereon the toner adheres to the electrostatic latent image.

Figure 13:
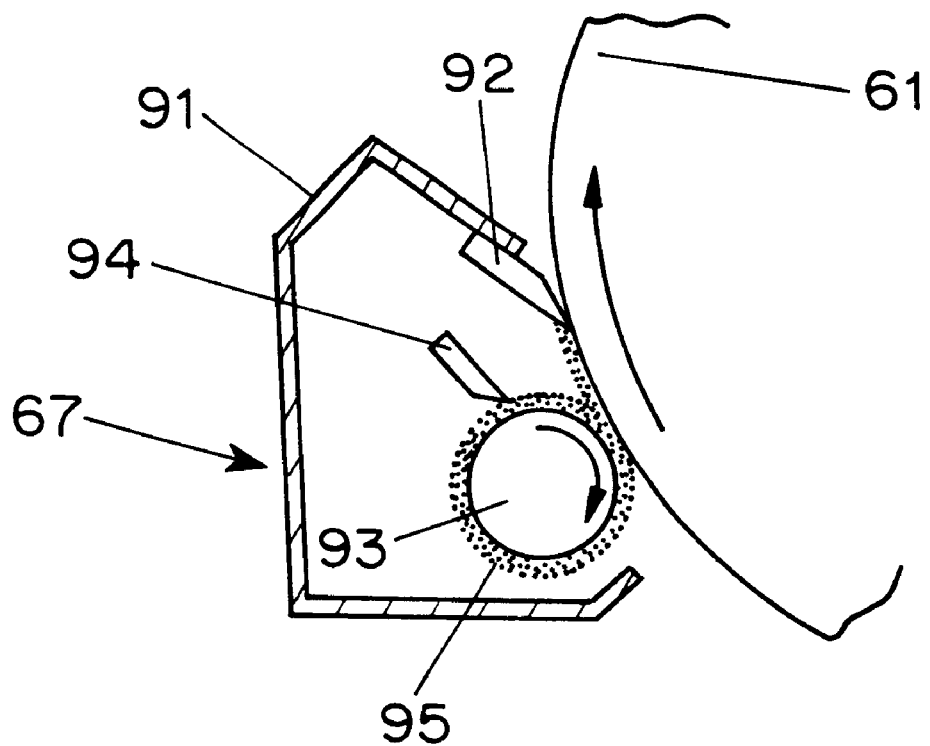
FIG. 13 is a schematic explanatory diagram of a cleaning apparatus.

FIG. 13 is a schematic diagram showing an example of the cleaning apparatus 67. A cleaning blade 92 made of an elastic material such as urethane rubber, a cleaning roller 93 formed of a magnetic roller and a doctor blade 94 for keeping the thickness of a magnetic toner layer 95 on the cleaning roller 93 constant are arranged inside the housing 91 of the cleaning apparatus 67. The toner remaining on the photosensitive drum 61 is removed by interaction between it and the magnetic toner layer 95 on the cleaning roller 93 or its adhesion to the surface of the photosensitive drum is weakened. The photosensitive drum 61 is covered with a magnetic toner layer by contacting the magnetic toner layer 95. The magnetic toner layer covering the photosensitive drum 61 is removed by the cleaning blade 92 together with the remaining toner. The thus removed toner is discharged into an unshown collector.

Figure 1:
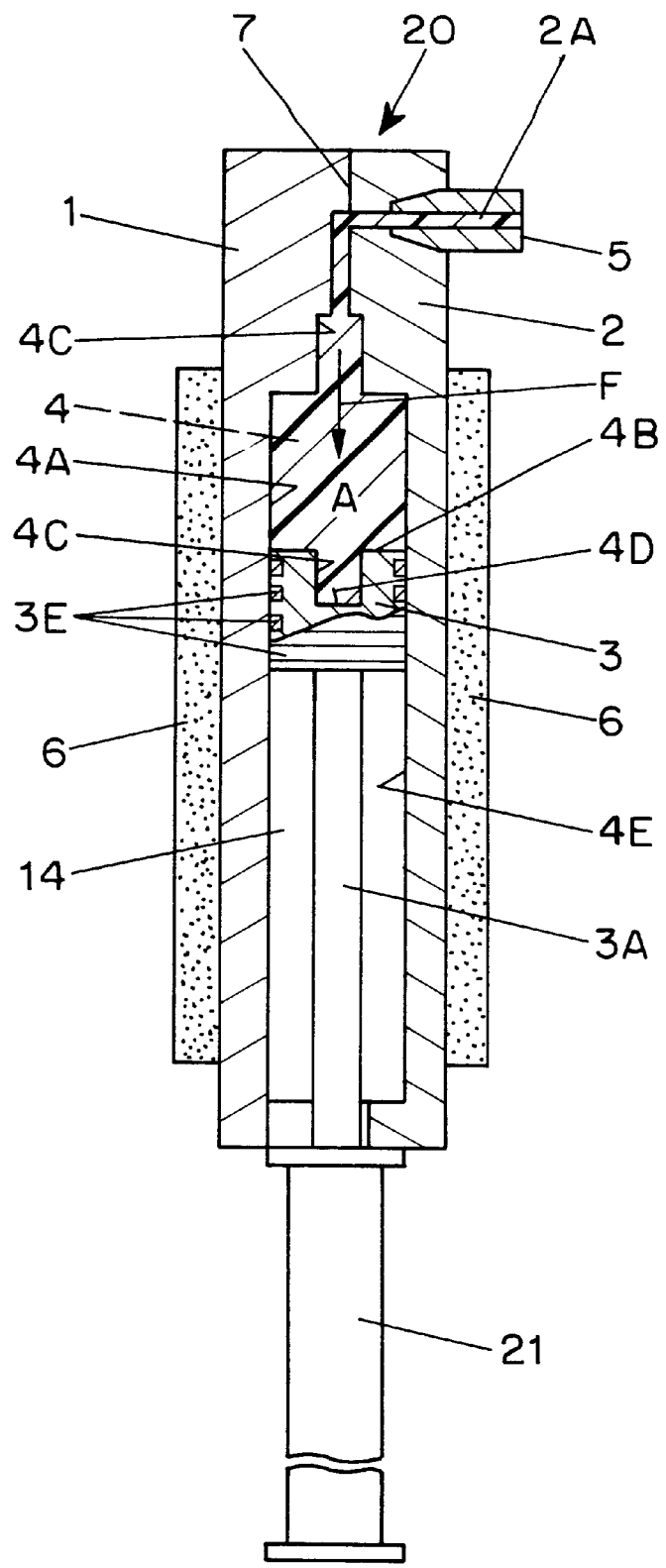
FIG. 1 is a cross-sectional view illustrative of an example of a metal mold for magnetic field injection molding used in a method in accordance with the present invention.
Figure 2:
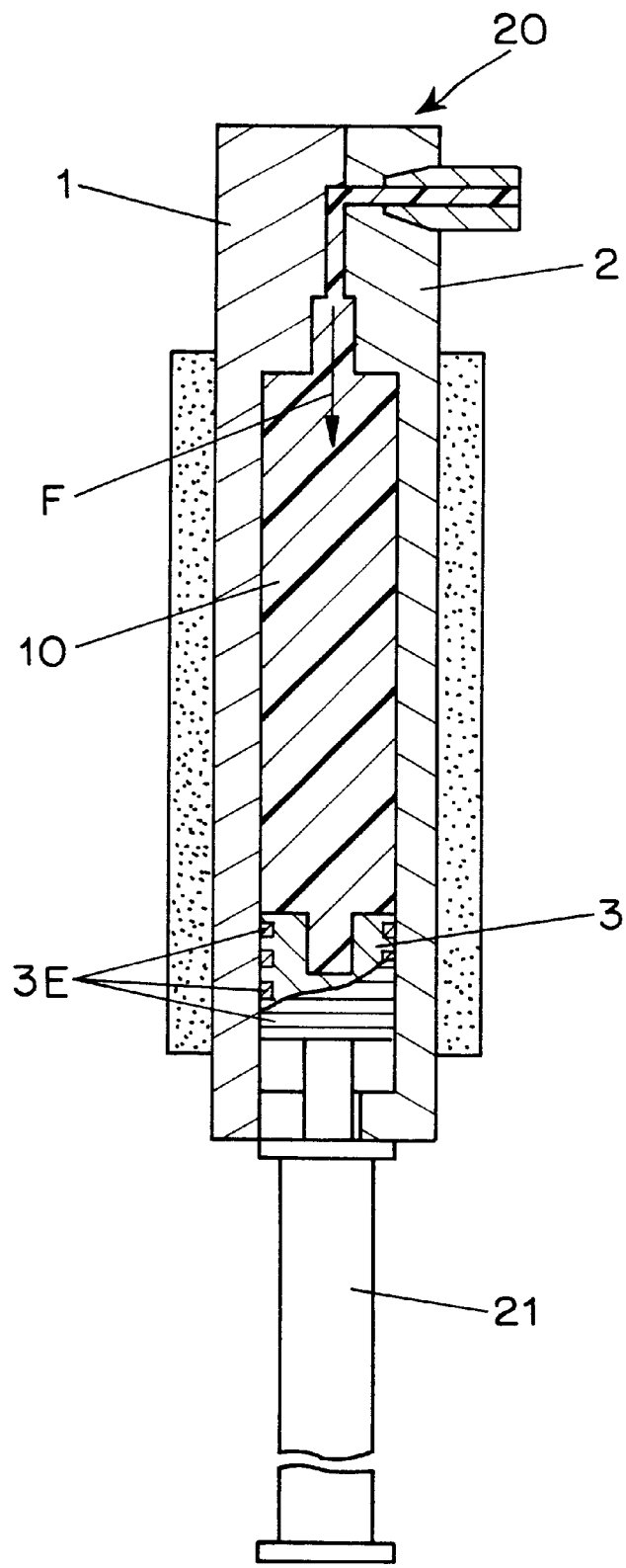
FIG. 2 is a cross-sectional view of the metal mold for magnetic field injection molding during the application of dwell pressure.

FIGS. 1 and 2 are cross-sectional views of an exemplary mold for magnetic field injection molding which is used in the production of the magnetic roller. FIG. 1 shows the injection operation state of a molding cycle and FIG. 2 shows the pressure maintenance operation state.

The mold 20 for magnetic field injection molding consists of fixed molds 1 and 2 for forming a cavity 4, and a movable mold 3. The movable mold 3 is incorporated in the fixed mold 2. The movable mold 3 is made of a metal or resin cylindrical body and provided with at least one O ring 3E made of rubber or the like on the outer surface thereof to prevent the effluence of a melted resin magnetic material. The fixed molds 1 and 2 are each provided with a magnetic field generating apparatus 6 on the outer side thereof to apply a magnetic field to all or part of the cavity 4. With a parting line 7 serving as a borderline between movable and fixed sections of an unshown injection molding apparatus, the fixed mold 1 is attached to the movable section of the injection molding apparatus and the fixed mold 2 to the fixed section of the injection molding apparatus. A cooling pipe, not shown, for controlling the temperatures of the molds is built in the injection molding apparatus so that the temperatures of the mold 1 and the mold 2 are preferably maintained at 100 to 110° C. An injection hole 2A for injecting a resin magnetic material, which engages with the nozzle 5 of the injection molding apparatus, is provided above the molds 1 and 2.

Referring to FIG. 1, a movable mold 3 constitutes a part of the wall surface of a cavity 4; it has cavity wall surface segments 4B, 4C, and 4D of the magnet roller. The movable mold 3 is free to vertically slide on a mold wall surface segment 4E which is constituted by cover mold counterparts 1 and 2. The rear end of the movable mold 3 is connected to a sliding rod 3A which is provided with a force toward an injection hole 2A by an air cylinder 21. The biasing force given by the air cylinder 21 is set to approximately 5 kgf when the injection pressure of a resin-bonded magnet material is, for example, 500 kgf. The back pressure provided by the air cylinder 21 or the like, i.e., the load on the movable mold 3 over a cross-sectional area of the cavity 4, is preferably 0.5 to 50 kg/cm². When the back pressure is less than 0.5 kg/cm², a density of the charged resin-bonded magnet material becomes low, whereas when the back pressure exceeds 50 kg/cm², such problems arise as a magnetic force of the obtained magnet body is deteriorated.

The resin-bonded magnet material is prepared by mixing and kneading a binder and magnetic powder and forming the mixture into pellets. For the binder, the following may be employed: nylon 6, polystyrene, polyethylene terephthalate (PET), polybutylene terephthalate (PBT), PPS, EVA, EEA, EvOH, polypropylene, polyethylene, polyethylene copolymer, or other polyolefin, or a modified polyolefin produced by introducing a reactive functional group such as a maleic anhydride group, a carboxyl group, a hydroxyl group, and a glycidyl group into the structure of the polyolefin.

The blending quantity of the binder is not restricted, however, the binder of about 8 to about 40 wt % is commonly used (most commonly 10 to 20 wt %).

For the magnetic powder used in this embodiment, magnetic powder commonly used for resin magnet may be employed; examples include barium ferrite, strontium ferrite, or other ferrite, an Sm—Co type alloy, an Nd—Fe—B type alloy, or other rare earth type alloy. There is no particular restrictions on the blending quantity of the magnetic powder; it is properly decided according to the magnetic property required of the magnetic roller, however, it commonly ranges from 60 to 92 wt % of the entire resin magnet composition, most commonly about 80 to about 90 wt %.

As necessary, a filler with great reinforcing effect such as mica, whisker, talc, carbon fiber, and glass fiber may be added to the resin magnet composition in addition to the binder and magnetic powder. More specifically, if relatively low magnetic force is required of the molding and the charging quantity of the magnetic powder such as ferrite is small, then the rigidity of the resulting molding tends to be low; therefore, such filler as mica or whisker may be added to increase the rigidity of the molding.

In this case, mica or whisker is suitably used as the filler. For the whisker, the following may be preferred: a nonoxide based whisker composed of silicon carbide, silicon nitride, etc., or a metal oxide based whisker composed of ZnO, MgO, $TiO_2$, $SnO_2$, $Al_2O_3$, etc., or a complex oxide based whisker composed of potassium titanate, aluminum borate, chlorinated magnesium sulfate, etc. Among these, the complex oxide based whisker is especially suited for the purpose because of its good compatibility with plastics.

There is no particular restrictions on the blending ratio for the filler; however, it typically ranges from 2 to 32 wt % of the entire resin magnet composition, most typically about 5 to about 20 wt %.

The method for filling the cavity 4 with the melted resin-bonded magnet material while moving the movable mold 3 will now be described.

When a metal mold 20 for magnetic field injection molding is clamped, the movable mold 3 is disposed toward the injection hole 2A along the mold wall surface segment 4E in such a manner that it juts out into a hollow 14 of the metal mold due to a biasing force provided by the air cylinder 21 via the sliding rod 3A, the cavity wall surface segment 4B of the movable mold 3 is almost in contact with or in contact with the cavity wall surface segment 4B of the mold counterparts 1 and 2. Hence, the volume of the cavity 4 in the state, where the sliding rod 3A is provided with a force by the air cylinder 21, is equal to the volume of the hollow formed by the cavity wall surface segment 4C of the fixed mold counterparts 1 and 2 and the cavity wall surface segments 4C and 4D of the movable mold 3. This volume is substantially the smallest.

As shown in FIG. 1, from the state described above, the magnetic field generator 6 is actuated to apply a predetermined magnetic field and the melted resin-bonded magnet material 10 is injected through a nozzle 5 as indicated by an arrow A into the hollow formed by the cavity wall surface segments 4B, 4C, and 4D of the mold 3. Flowing pressure F of the melted resin magnetic material 10 is received by the cavity wall surface segments 4B, 4C, and 4D of the movable mold 3.

Continued injection of the melted resin-bonded magnet material 10 further increases the flowing pressure; in response to the increase in the flowing pressure, i.e. the increase in the melted material, the movable mold 3 starts to move back in the opposite direction from the direction of the biasing force, i.e. downward in FIG. 1, by the increase in the volume of the melted material while balancing with the biasing force of the air cylinder 21 via the sliding rod 3A. Thus, the area of the cavity wall surface segment 4A gradually increases. Continuing the injection of the melted resin and the reverse movement of the movable mold 3 at the same time enables the resin-bonded magnet material 10 to be uniformly and densely charged in the cavity of the mold as shown in FIG. 2.

Figure 3:
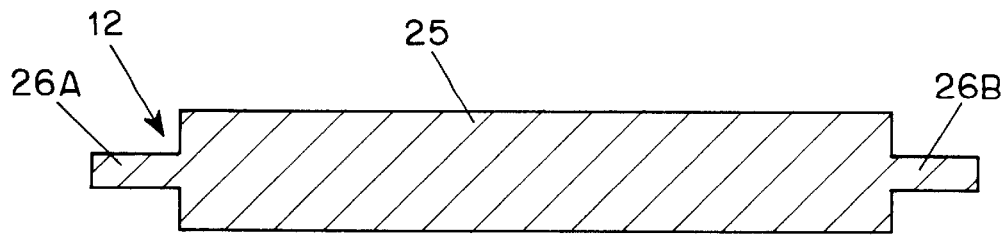
FIG. 3 is a cross-sectional view of a magnet roller made integral with a shaft.

During the molding process, the resin-bonded magnet material 10 is magnetized into a resin magnet by the applied magnetic field. Cooling the mold counterparts 1 and 2 at a constant rate molds a magnet roller 12 composed of the resin magnet. After a predetermined time elapses, the metal mold 20 is split to take out the magnet roller 12 made integral with a shaft which has been molded as shown in FIG. 3. The magnet roller 12 shown in FIG. 3 has shafts 26A and 26B on both ends of a magnet body 25 which have been molded as one piece with the magnet body 25 by using a resin magnet composition.

Figure 4A:
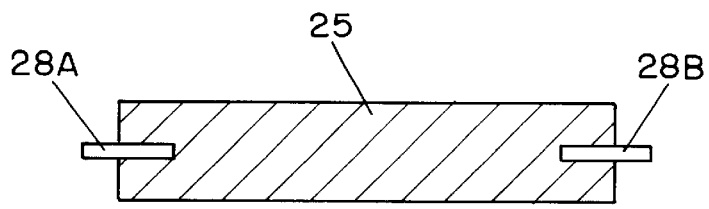
FIGS. 4(A) and (B) are cross-sectional views illustrating the structures of the magnet rollers.
Figure 4B:
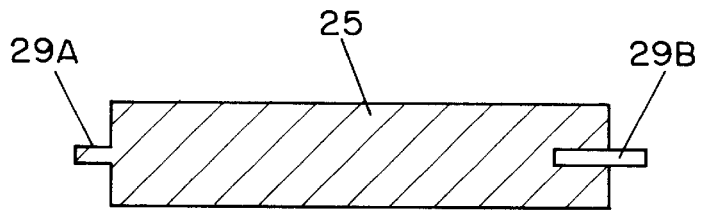

As shown in FIG. 4(A), the shaft section of the magnet roller may be composed of metallic shafts 28A and 28B which do not pass through the magnet body 25 but are buried so that they jut out in the axial direction from both ends of the magnet body 25. Further alternatively, as illustrated in FIG. 4(B), one shaft 29A may be molded integrally with the magnet body 25 whereas the other shaft 29B may be a metallic shaft embedded in the magnet body 25. These shafts 26A, 26B, 28A, 28B, 29A, and 29B may be equipped with driving gears for rotating the roller. When producing the magnet rollers shown in FIG. 4(A) and FIG. 4(B), the shafts 28A and 28B or 29B are inserted after forming the magnet body 25 with the metal mold.

Figure 14:
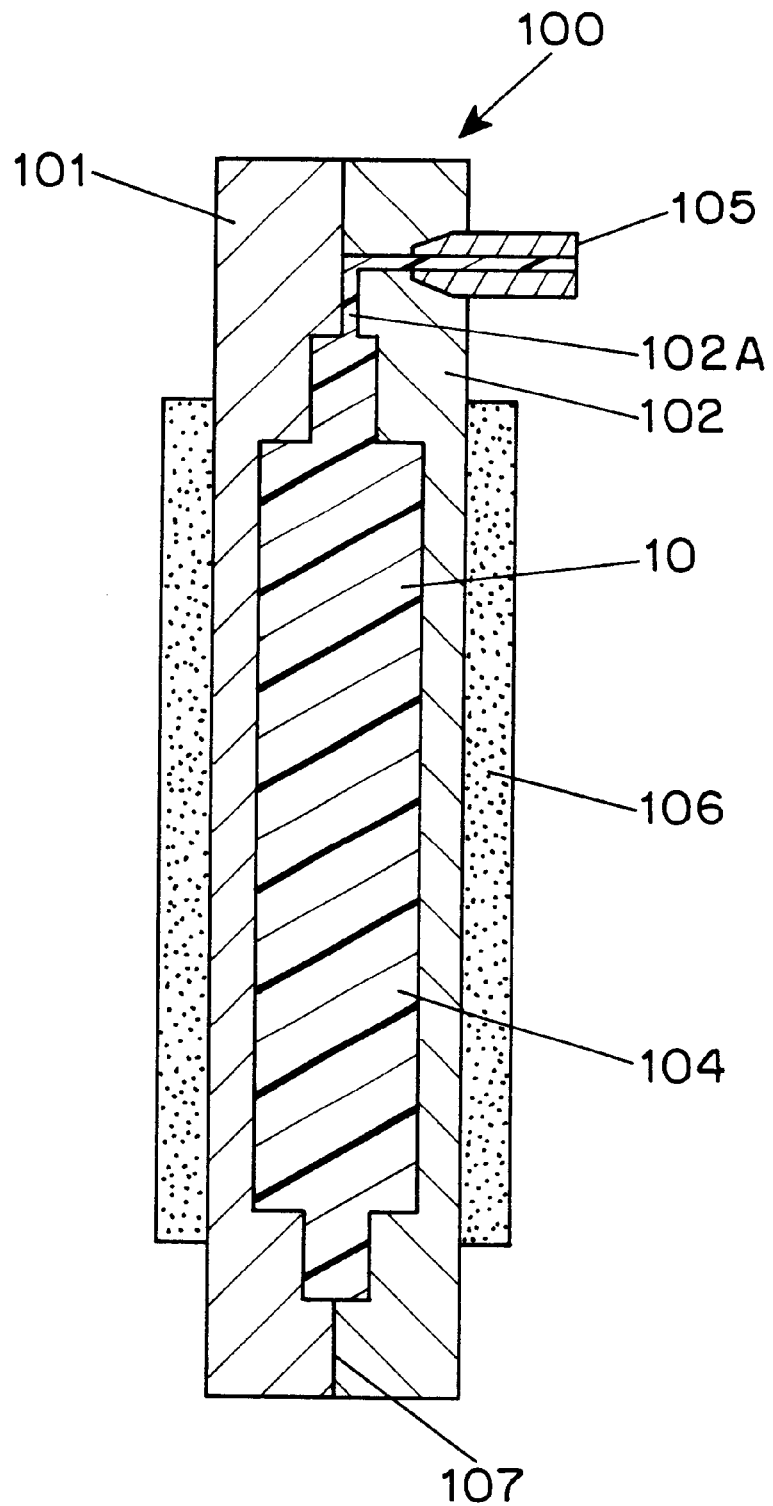
FIG. 14 is a cross-sectional view of a metal mold which molds a conventional magnet roller.
Figure 15A:
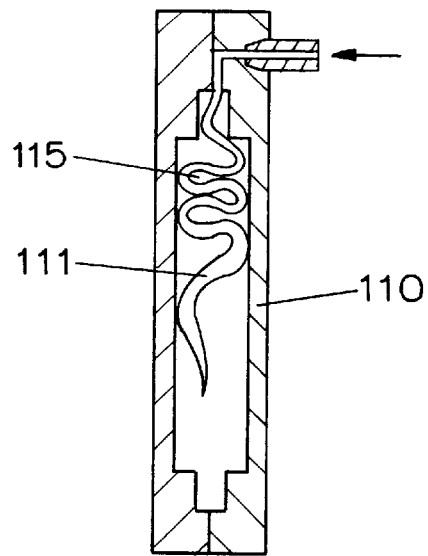
FIGS. 15(A) to FIG. (C) are explanatory diagrams of a flow mark and a bubble.
Figure 15B:
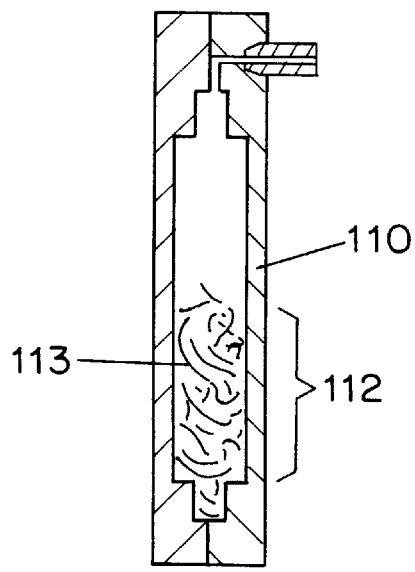
Figure 15C:
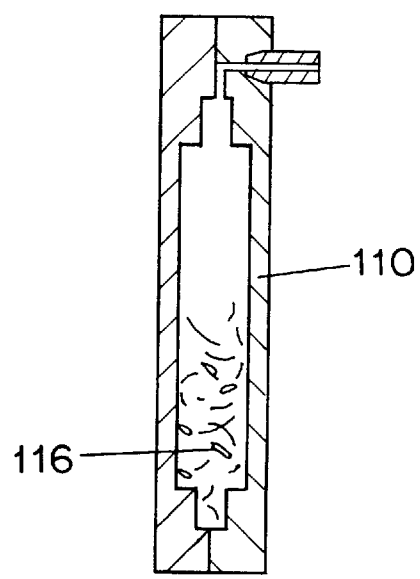
Figure 16:
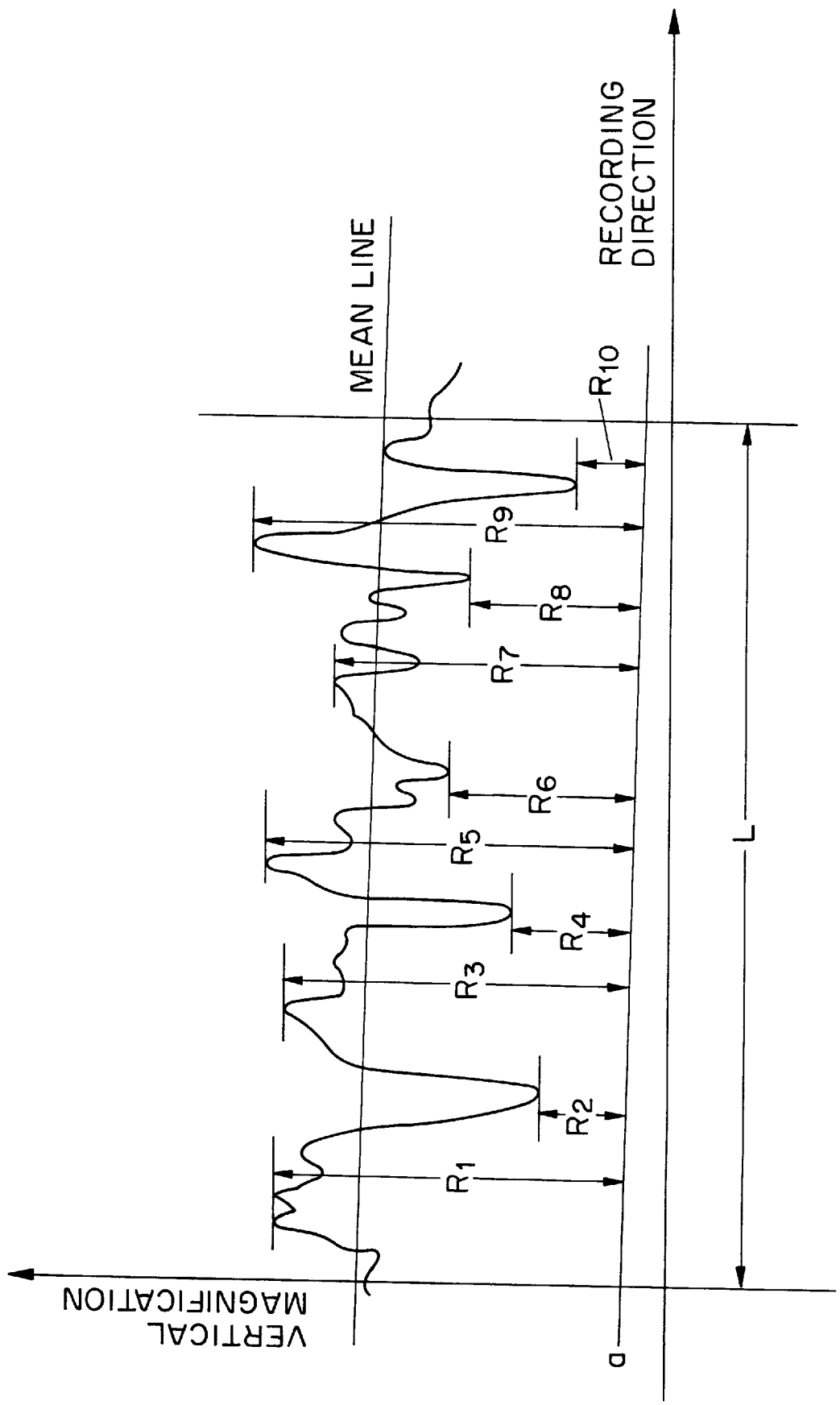
FIG. 16 illustrates a roughness profile for explaining ten-point mean roughness Rz according to JIS B-0601.

The inventors have compared the performance of the magnet roller, which has been manufactured by using the metal mold 20 for magnetic field injection molding shown in FIG. 1 and FIG. 2 and by using the method in accordance with the present invention, with the performance of the magnet roller which has been manufactured by using the metal mold 100 for magnetic field injection molding shown in FIG. 14 and by using the conventional method.

As the binder, 12 wt % of nylon 6 was used; and as the magnetic powder, a resin-bonded magnet material which contains 88 wt % of Sr ferrite was used. The nylon 6 and the resin-bonded magnet material were melted and mixed by a kneader and the mixture was shaped into pellets by extrusion molding.

The pellet was injected into the metal mold 20 shown in FIG. 1 and FIG. 2 around which a magnetic field generator was provided to magnetize it in a 4-pole magnetic force pattern composed of S1, N1, S2, and N2. Thus, a magnet roller was produced which measured 17.5 mm in the diameter of the magnet body and 304 mm in length. The injecting conditions were as follows: the cylinder temperature was 280 degrees centigrade, the molding temperature was 100 degrees centigrade, the injection pressure was 700 kg/cm$^2$; and the back pressure was 7.0 kg/cm$^2$.

Another pellet as stated above was also injected into the conventional metal mold 100 shown in FIG. 14 around which the magnetic field generator was provided to magnetize it in the 4-pole magnetic force pattern composed of S1, N1, S2, and N2. Thus, a magnet roller for the comparison was made; it measured 17.5 mm in the diameter of the magnet body and 304 mm in length. The same molding conditions were applied.

The results of the measurement of the properties of the magnet roller produced in accordance with the present invention and of the properties of the magnet roller produced in accordance with the conventional method (Comparative Example 1) are shown in Table 1. The ripple value in the table indicates the maximum difference in magnetic force between adjacent points when the magnetic force of pole S1 of the magnetic roller is measured at intervals of 1 mm along the axis of the roller. The warp is based on the difference between maximum value and minimum value measured when the magnet roller was rotated with a dial gauge applied to the central part of the magnet body and with the shafts on both ends of the magnet roller supported. The standard deviation values of the ripple and warp given in the table are those taken from the standard deviation values of the ripples and warps observed in lots of fifty magnet rollers, each of the lots being manufactured according to the respective methods. Rz ($\mu$m) indicates the 10-point average roughness measured according to JIS Standard, namely, JIS B0601-1982. The out-of-roundness indicates the difference between the maximum radius and the minimum radius observed in terms of a cross section perpendicular to the axis of the magnet body. The out-of-roundness is zero in the case of an ideal cylindrical shape; the more distorted the shape, the greater the value of the out-of-roundness.

Surface roughness Rz of the inner surface of the mold was 1.0 $\mu$m. The surface roughness Rz of the magnet roller of the Comparative Example 1 could not be determined since a flow mark was formed on the surface.

TABLE 1

| | Ripple Value (Gauss) | Standard Deviation of Ripple (Gauss) | Warp ($\mu$m) | Standard Deviation of Warp ($\mu$m) | Rz ($\mu$m) | Out-of-Roundness ($\mu$m) |
|---|---|---|---|---|---|---|
| Embodiment | 3.6 | 0.2 | 130 | 23 | 1.2 | 60 |
| Comparative Example 1 | 10.5 | 5.5 | 420 | 161 | Unmeasurable | 150 |

As is obvious from Table 1, all the ripple value, warp, surface roughness Rz, and out-of-roundness of the magnet roller produced according to the present invention are remarkably smaller than those of the magnet roller of Comparative Example 1. Moreover, as is obvious from the standard deviation values of the ripple and warp, the method in accordance with the present invention enables the manufacture of magnet rollers which exhibit more homogeneous characteristics than those of the magnet rollers manufactured using the conventional method.

Figure 8:
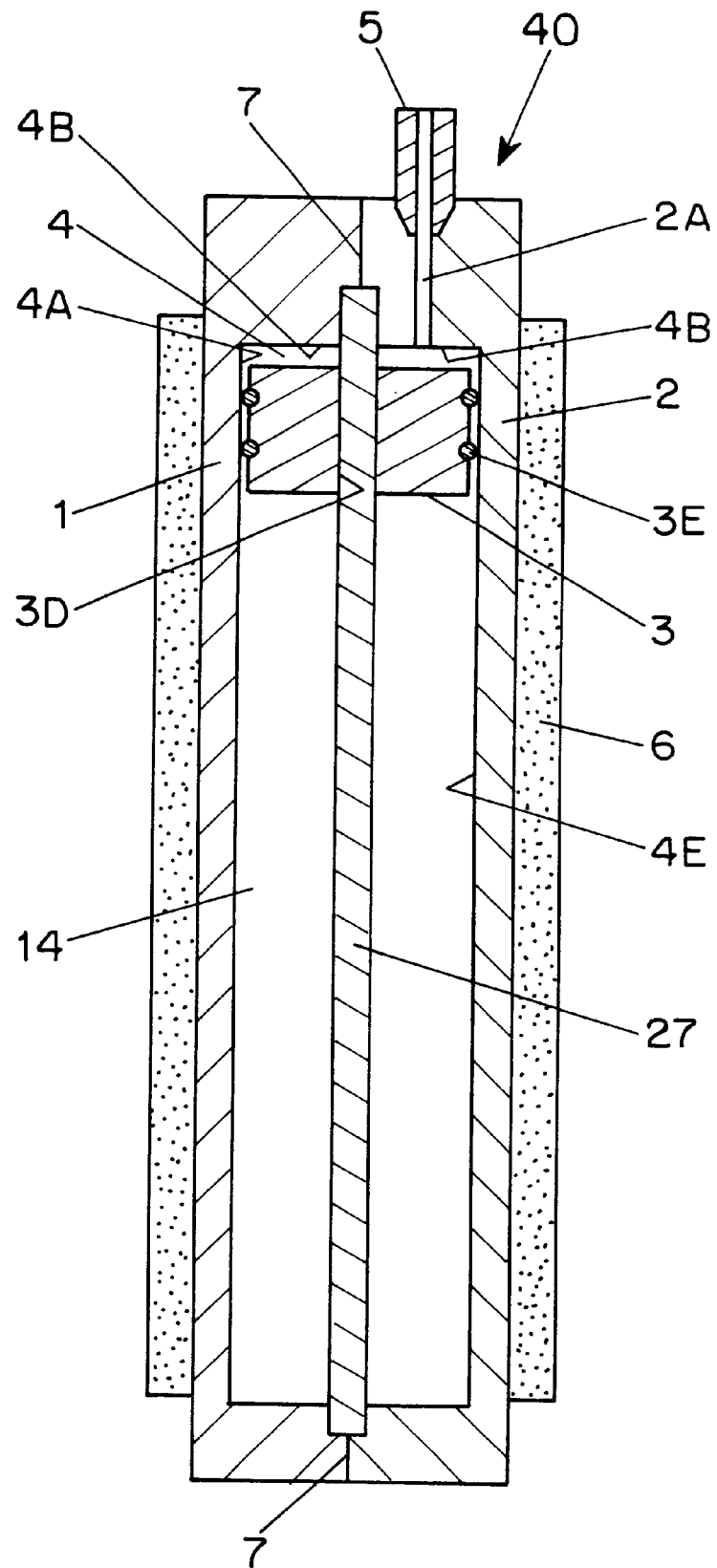
FIG. 8 is a cross-sectional view illustrative of a metal mold for magnetic field injection molding for a comparative example.
Figure 9:
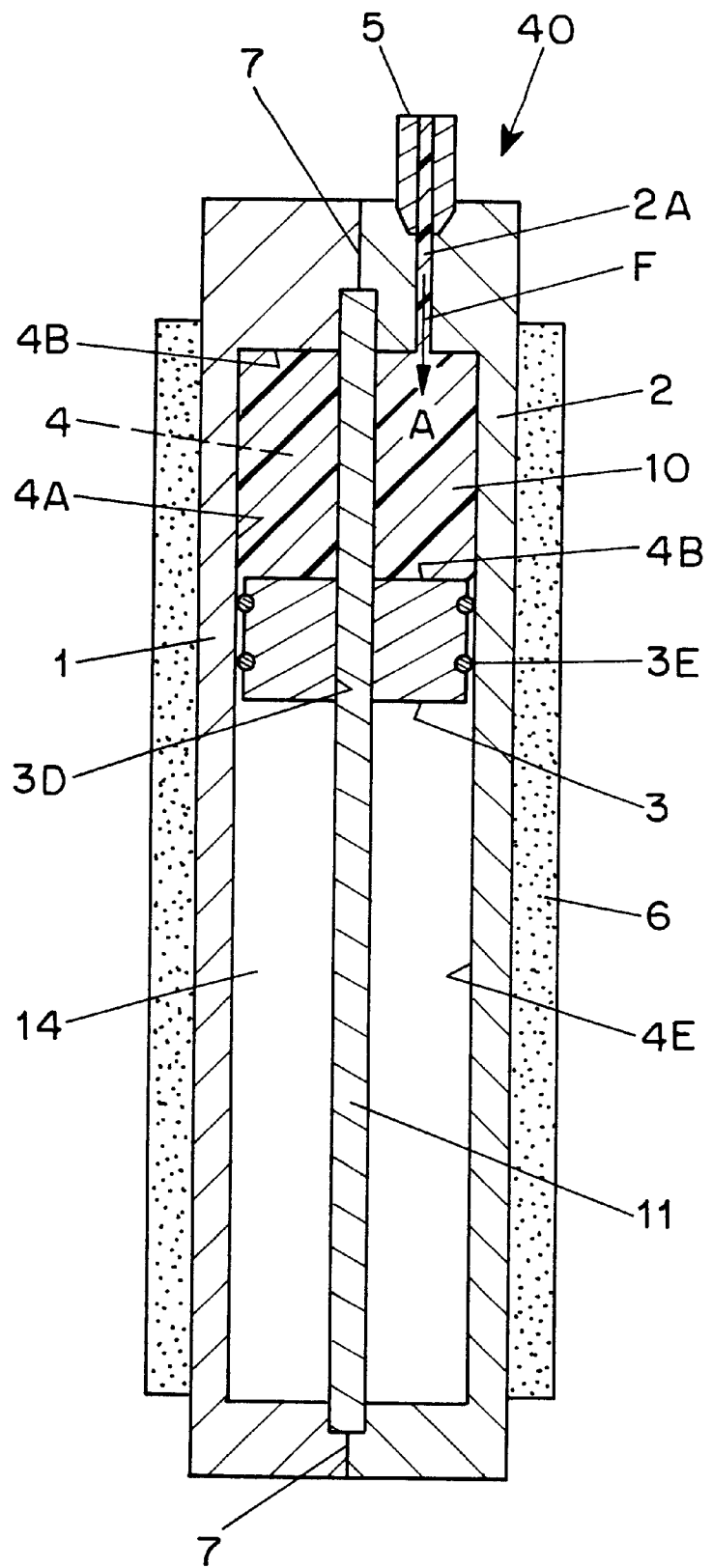
FIG. 9 is a cross-sectional view illustrative of the metal mold for magnetic field injection molding for the comparative example, which molds the magnet roller.
Figure 10:
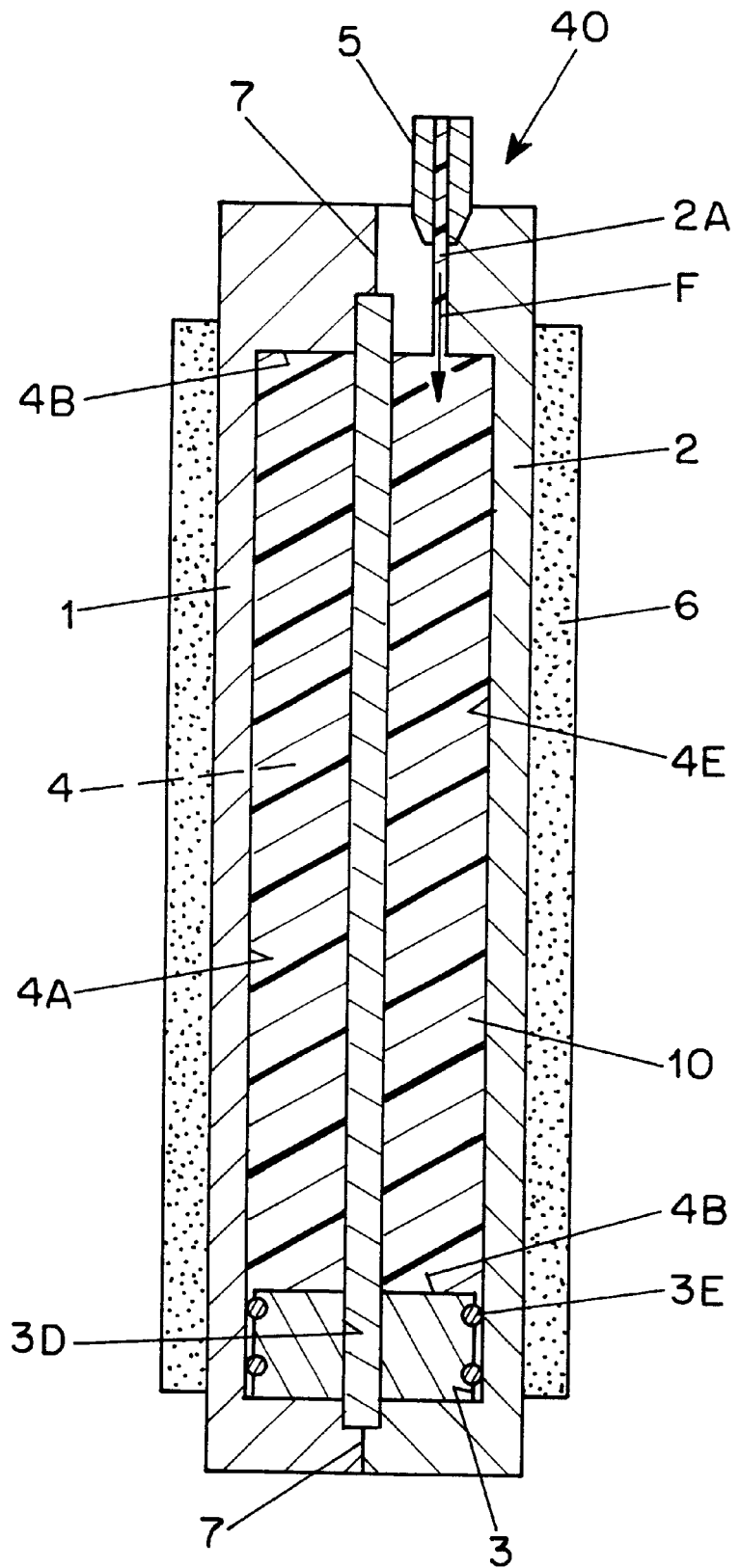
FIG. 10 is another cross-sectional view illustrative of the metal mold for magnetic field injection molding for the comparative example, which molds the magnet roller.
Figure 17:
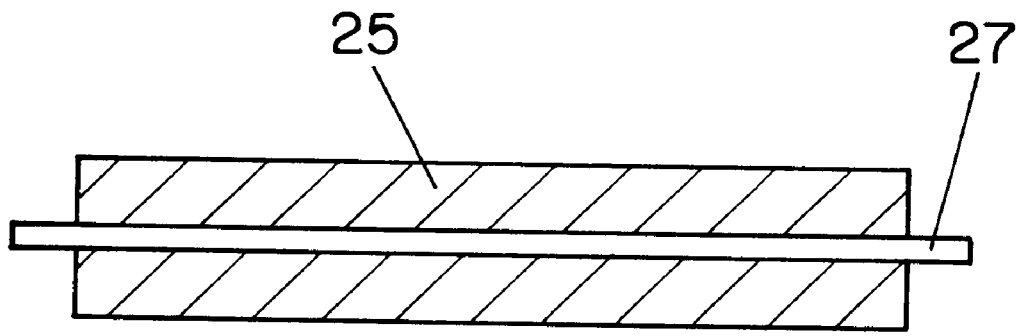
FIG. 17 is a cross-sectional view illustrative of the structure of a magnet roller made integral with a shaft for the comparative example.

In order to confirm the effects of the present invention in relation to the structure of the magnet roller, a metal mold shown in FIG. 8 is prepared, and magnet rollers described below are produced as Comparative Examples 2 and 3. A metal mold 40 is used to make a magnet roller made integral with a shaft by molding the roller-shaped magnet body 25 made of a resin-bonded magnet material and a metallic mandrel 27 as one piece as shown in FIG. 17. FIG. 8 shows the cross section of the metal mold for magnetic field injection molding, the metal mold being clamped; FIG. 9 and FIG. 10 show the cross section of the metal mold which is molding the magnet roller.

The metal mold 40 for magnetic field injection molding is constructed by the fixed mold counterpart 1, the fixed mold counterpart 2, and the movable mold 3 which form the cavity 4. At the time of clamping, the fixed mold counterpart 1 and the fixed mold counterpart 2 can be fixed, holding the metallic mandrel 27 at the center of the hollow 14 of the metal mold. The movable mold 3 is composed of a columnar object of metal, resin, etc. which has a through hole 3D into which the mandrel 27 is inserted; at least one O ring 3E made of rubber or the like is provided on the outer circumferential surface for preventing the melted resin-bonded magnet material from flowing out. The movable mold 3 is guided by the mandrel 27 fixed on the fixed mold counterparts 1 and 2 and it is free to move between one end and the other end of the cavity wall surface segment 4B of the fixed mold counterparts 1 and 2 by sliding along the mold wall surface segment 4E.

The magnetic field generator 6 for applying a magnetic field to the whole or a part of cavity 4 is provided around the fixed mold counterparts 1 and 2. With a parting line 7 as the boundary, the fixed mold counterpart 1 is mounted on the movable section of an injection molding apparatus, not shown, and the fixed mold counterpart 2 is attached to the fixed section of the injection molding apparatus. Although they are not shown, the fixed mold counterparts 1 and 2 incorporate cooling pipes for controlling the temperature of the metal mold. The top of the mold counterpart 2 has the injection hole 2A in which the nozzle 5 of the injection molding apparatus is fitted for injecting the resin-bonded magnet material therethrough.

As shown in FIG. 8, when the metal mold 40 is clamped, the movable mold 3 is brought close to the cavity wall surface segment 4B on the injection hole 2A side so that the cavity 4 has the minimum volume. Under this condition, the magnetic field generator 6 is actuated to apply a predetermined magnetic field to the hollow 14 of the metal mold and the melted resin-bonded magnet material 10 is injected as indicated by arrow A inside the cavity wall surface segment 4B of the mold 3 through the nozzle 5 as shown in FIG. 9. Flowing pressure F of the melted resin magnetic material 10 is received by the cavity wall surface segments 4B of the movable mold 3.

Continued injection of the melted resin-bonded magnet material 10 further increases the flowing pressure due to the injection; in response to the increase in the flowing pressure, i.e. the increase in the melted resin-bonded magnet material, the movable mold 3 moves back toward the end of the hollow 14 of the metal mold on the opposite side from the injection hole 2A, i.e. downward in FIG. 9, by the increased volume of the melted resin-bonded magnet material 10 while balancing with the frictional force between the O ring 3E and the wall surface segment 4E of the mold counterparts 1 and 2, thus increasing the area of the cavity of the cavity wall surface segment 4A.

Continuing the injection of the melted resin-bonded magnet material and the reverse movement of the movable mold 3 at the same time enables the resin-bonded magnet material to be uniformly and densely charged in the cavity 4 of the metal mold as shown in FIG. 10. During the molding process, the resin-bonded magnet material 10 is magnetized into a resin magnet by the applied magnetic field. Cooling the fixed mold counterparts 1 and 2 at a constant rate molds a magnet roller composed of the resin magnet. After predetermined time elapses, the metal mold 40 is split to take out the magnet roller made integral with a shaft which has been molded as shown in FIG. 17. The thus-produced magnet roller is employed as the magnet roller of Comparative Example 2.

Next, the movable mold 3 is taken away from the metal mold 40 shown in FIG. 8, and a metallic mandrel 27 is introduced to be fixed at the center of the hollow 14 formed by the fixed mold counterparts 1 and 2. Then, the magnetic field generator 6 is actuated to apply a magnetic field to the hollow 14, thereby similarly producing a magnet roller made integral with a shaft shown in FIG. 17. The thus-produced magnet roller is employed as the magnet roller of Comparative Example 3.

The properties of the magnet rollers made integral with shafts of Comparative Examples 2 and 3 were measured. The results are summarized in Table 2 in a similar manner as Table 1. The conditions for producing the magnet rollers of Comparative Examples 2 and 3 were the same as those employed in Table 1 except that an axis of 8 mm$\phi$×304 mm was used.

TABLE 2

| | Ripple Value (Gauss) | Standard Deviation of Ripple (Gauss) | Warp ($\mu$m) | Standard Deviation of Warp ($\mu$m) | Rz ($\mu$m) | Out-of-Roundness ($\mu$m) |
|---|---|---|---|---|---|---|
| Comparative Example 2 | 4.3 | 0.1 | 315 | 20 | 1.9 | 103 |
| Comparative Example 3 | 4.8 | 0.6 | 350 | 50 | 2.2 | 141 |

As can be seen from Table 2, when the present invention is employed for a magnet made integral with the shaft, there is an effect of enhancing the characteristics to some extent, but no such remarkable improvement as that seen in the case of the magnet without a shaft shown in Table 1 was recognized.

Figure 5:
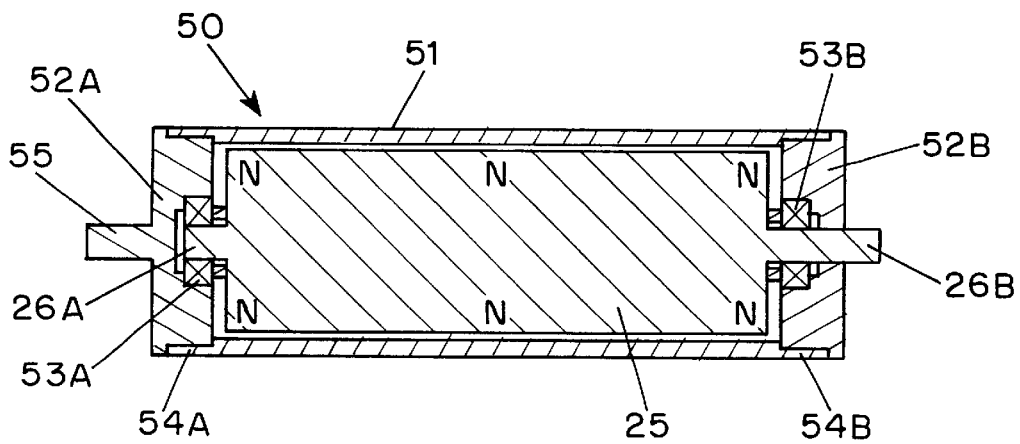
FIG. 5 is a schematic cross-sectional view of a developing roller.

Using the magnet roller, which had been produced according to the present invention, a developing roller employed for the developing section in an electrophotographic copier or laser beam printer was produced. A developing roller 50 has a structure shown by the cross-sectional view given in FIG. 5, wherein an aluminum cylinder or sleeve 51 is disposed with a small gap provided between itself and the magnet roller 25 and side discs 52A and 52B made of a nonmagnetic material are attached to the ends thereof by fixing sections 54A and 54B. The sleeve 51 is rotatably mounted on the shafts 26A and 26B of the magnet roller 25 by bearings 53A and 53B. The shaft 26A of the magnet roller passes through the side disc 52B The side disc 52A is provided with a shaft 55.

The developing roller 50 is mounted on the developing section of a copier or a laser beam printer by fixing the shaft 26B of the magnet roller 25 and by rotatably mounting the shaft 55 of the side disc. The sleeve 51 is rotated with respect to the fixed magnet roller 25 to carry the magnetic toner held on the surface of the sleeve and make it adhere to an electrostatic latent image on a photosensitive drum.

When this developing roller was used for the development, a good image which is free of longitudinal streaks attributable to the variations in the magnetic force in the axial direction was produced.

Figure 6:
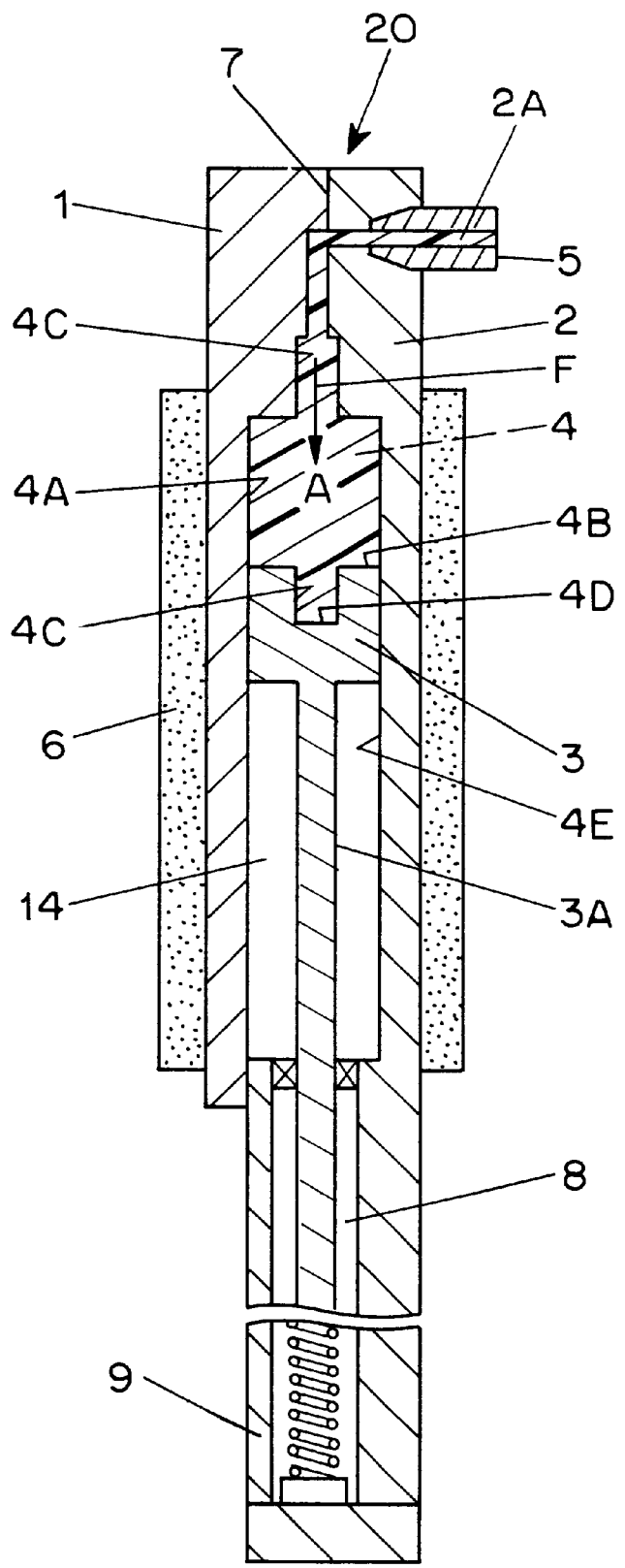
FIG. 6 is a cross-sectional view illustrative of another example of the metal mold for magnetic field injection molding used in the method in accordance with the present invention.

In the metal mold for magnetic field injection molding shown in FIG. 1 and FIG. 2, a coil spring 8 as shown in FIG. 6 may be used in place of the air cylinder as the means for providing a biasing force to the movable mold via the sliding rod 3A. In this case, the sliding rod 3A connected to the rear end of the movable mold 3 is slidably supported by a bushing 9 incorporated in the mold counterpart 2 and the end of the sliding rod 3A is supported by the coil spring 8 which provides a biasing force to the movable mold 3 via the sliding rod 3A.

Figure 7:
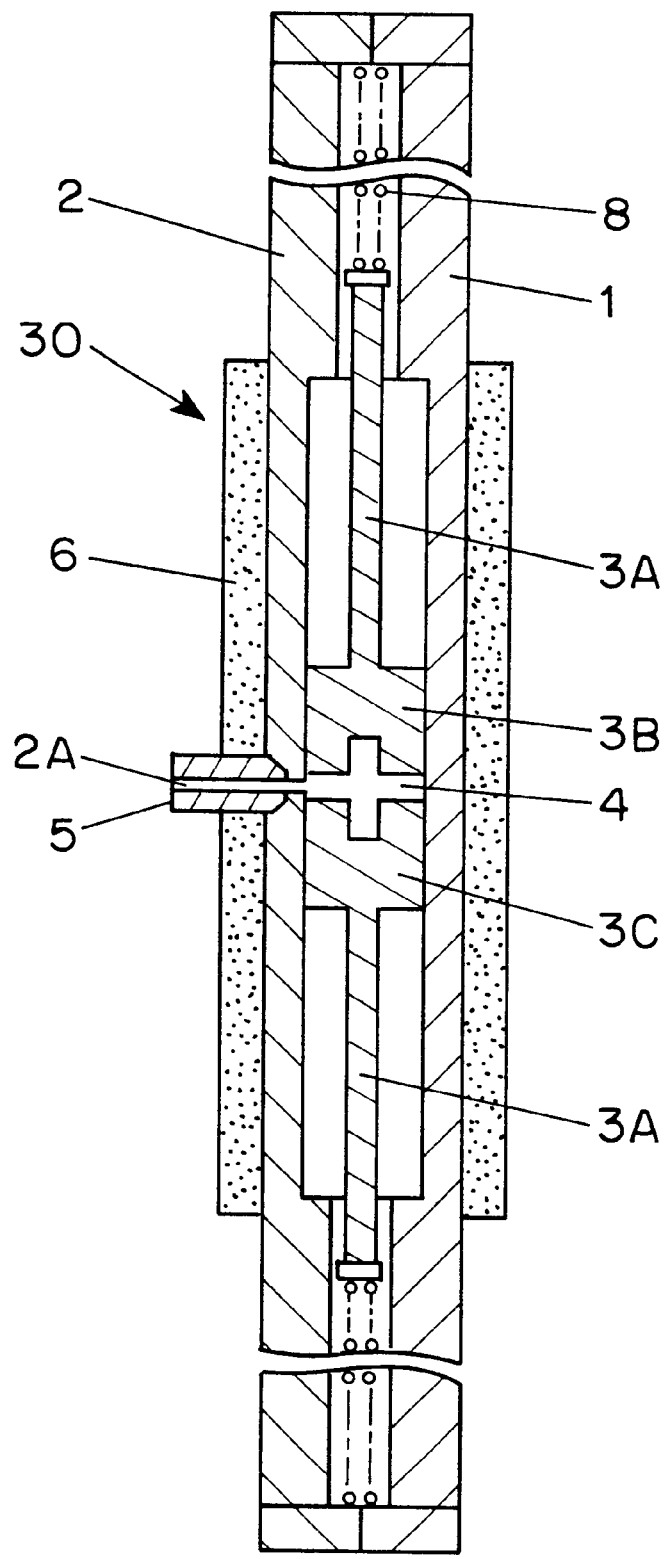
FIG. 7 is a cross-sectional view illustrative of still another example of the metal mold for magnetic field injection molding used in the method in accordance with the present invention.

FIG. 7 is a cross-sectional diagram for illustrating another example of the metal mold for magnetic field injection molding employed in the method in accordance with the present invention. A metal mold 30 in this example is provided with a plurality of (two in FIG. 7) movable mold counterparts composed of columnar objects of metal, resin, etc.; it is designed so that movable mold counterparts 3B and 3C move forward or backward equidistantly in lateral symmetry with respect to the injection hole 2A. The rear ends of the movable mold counterparts 3B and 3C are connected to the sliding rods 3A and the ends of the sliding rods 3A are supported by the coil springs 8.

When the metal mold 30 composed of the fixed mold counterparts 1 and 2 is clamped, the movable mold counterparts 3B and 3C are provided with biasing forces by the coil springs 8 via the sliding rods 3A in the direction in which they approach toward each other and the volume of the cavity 4 is the minimum. Under this condition, the magnetic field generator 6 is actuated to apply a predetermined magnetic field and a melted resin-bonded magnet material is injected into the cavity 4 of the metal mold 30 through the nozzle 5. The flowing pressure of the melted resin-bonded magnet material is received by the cavity wall surfaces of the movable mold counterparts 3B and 3C. Continued injection of the melted resin-bonded magnet material further increases the flowing pressure; in response to the increase in the flowing pressure, i.e. the increase in the melted resin-bonded magnet material, the movable mold counterparts 5B and 3C move back in the opposite direction from the direction of the biasing force, i.e. in the lateral direction in FIG. 7, by the increase in the volume of the melted resin-bonded magnet material while balancing with the biasing forces of the coil springs 8 via the sliding rods 3A.

Thus, continuing the injection of the melted resin-bonded magnet material and the backward movement of the movable mold counterparts 3B and 3C at the same time enables the resin-bonded magnet material to be uniformly and densely charged in the cavity. During the molding process, the resin-bonded magnet material is magnetized into a resin magnet by the applied magnetic field. Cooling the mold counterparts 1 and 2 at a constant rate molds a magnet roller composed of the resin magnet. After a predetermined time elapses, the metal mold 30 is split to take out the magnet roller 12 made integral with a shaft which has been molded as shown in FIG. 3.

In FIG. 7, the coil springs 8 are used as the means for providing the biasing forces to the movable mold counterparts 3B and 3C via the sliding rods 3A; however, other means such as an air cylinder may be used for providing the biasing force in place of the coil spring.

According to the present invention, the chances of the defects on the surface and/or inside of magnet rollers manufactured by the magnetic field injection molding method can be remarkably reduced and the occurrence of warp in the magnet rollers can also be controlled. Moreover, the use of the magnet roller, which is manufactured by the method in accordance with the present invention, in a developing apparatus or a cleaning apparatus enables the apparatuses to produce good images.

What is claimed is:

1. An apparatus for producing a solid magnet roller, comprising:
    a fixed mold having an elongated cavity for forming a solid magnet body, the solid magnet body having first and second end faces, each end face having an end shaft;
    a movable mold disposed in the cavity, the movable mold being received in the fixed mold cavity for lengthwise movement for increasing or decreasing a volume of the cavity in accordance with an injected amount of melted resin-bonded magnet material composed primarily of magnetic powder and a binder;
    a biasing means extending into the cavity and applying a biasing force to the movable mold in a lengthwise direction of the cavity; and
    a magnetic field generator disposed around the fixed mold.

2. The apparatus for producing a solid magnet roller according to claim 1, wherein the movable mold moves in a lengthwise direction of the cavity with a back pressure of 0.5 to 50 kg/cm$^2$ against the biasing force provided by biasing means.

3. The apparatus for producing a solid magnet roller according to claim 1, wherein the biasing means is provided with force by a coil spring or an air cylinder.

4. The apparatus for producing a solid magnet roller according to claim 1, wherein at least one of the end shafts is molded with the solid magnet body.

5. The apparatus for producing a solid magnet roller according to claim 4, wherein both end shafts are molded with the solid magnet body.

6. The apparatus for producing a solid magnet roller according to claim 4, wherein the end shaft of the first end face is molded with the first end face, and the end shaft of the second end face is separately formed and subsequently attached to the second end face.

7. The apparatus for producing a solid magnet roller according to claim 1, wherein at least one of the end shafts is separately formed and subsequently attached to the respective end face of the solid magnet body.

8. The apparatus for producing a solid magnet roller according to claim 7, wherein both end shafts are separately formed and subsequently attached to the respective end faces.

* * * * *